United States Patent [19]

Hoehn et al.

[11] Patent Number: 4,718,810
[45] Date of Patent: Jan. 12, 1988

[54] HIGH SPEED TRANSPORTER FOR MULTIPLE STATION PRODUCTION LINE

[75] Inventors: Robert A. Hoehn, Monticello Township, Johnson County; Thomas B. Doyle, Overland Park, both of Kans.; Donald L. Van Pelt, Blue Springs, Mo.

[73] Assignee: Lico, Inc., Kansas City, Mo.

[21] Appl. No.: 806,287

[22] Filed: Dec. 6, 1985

[51] Int. Cl.$^4$ .............................................. B65G 1/00
[52] U.S. Cl. ...................................... 414/286; 104/45; 104/49; 198/346.1; 198/748; 198/346.2; 414/222; 414/501; 414/280; 414/750; 414/744 R; 414/525 R; 414/661; 414/278; 29/429
[58] Field of Search ............... 414/395, 222, 224, 225, 414/231, 241, 245, 246, 252, 253, 255, 256, 266, 267, 273, 280, 277, 282, 283, 286, 492, 498, 501, 525 R, 467, 608, 661, 785, 744 R, 749, 750, 278; 104/48, 49, 50, 45, 36; 198/721, 346.1, 803.1, 465.1, 346.2, 748; 29/429, 430

[56] References Cited

U.S. PATENT DOCUMENTS

| | | | |
|---|---|---|---|
| 2,899,043 | 8/1959 | Young | 414/728 X |
| 3,150,787 | 9/1964 | Patrignani | 414/661 |
| 3,237,789 | 3/1966 | Guilbert, Jr. | 414/661 |
| 3,565,270 | 2/1971 | Guilbert, Jr. et al. | 414/749 |
| 3,630,319 | 12/1971 | Peterson et al. | 414/661 X |
| 3,677,423 | 7/1972 | Tollefsrud et al. | 198/721 X |
| 3,738,506 | 6/1973 | Cornford et al. | 414/283 X |
| 3,756,433 | 9/1973 | Richins | 414/280 X |
| 3,921,828 | 11/1975 | Suizu | 414/280 |
| 4,277,217 | 7/1981 | Miller et al. | 414/395 |
| 4,358,239 | 11/1982 | Dechantsreiter | 198/748 X |
| 4,389,157 | 6/1983 | Bernard, II et al. | 414/280 X |

FOREIGN PATENT DOCUMENTS 789382  12/1980  U.S.S.R. ............................... 414/286

Primary Examiner—Frank E. Werner
Attorney, Agent, or Firm—D. A. N. Chase

[57] ABSTRACT

A high-speed, bidirectional transporter for a multiple station production line provides for the programmable pickup, transport and delivery of materials at non-sequential work stations along the production line. The transporter is self-propelled by a rack and pinion drive and moves along a track that defines a course through the multiple work stations. A turntable on the transporter carries an extensible and retractable arm whose motion, when coupled with a materialladen pallet, provides for either the pickup or delivery of a pallet to or from an individual work station. Coupling and uncoupling of the arm with a pallet is effected by the controlled rotation of the turntable, which is capable of 180 degrees of rotation to also impart to the transporter the ability to transfer pallets off of both sides to address a work station on either side of the track.

18 Claims, 15 Drawing Figures

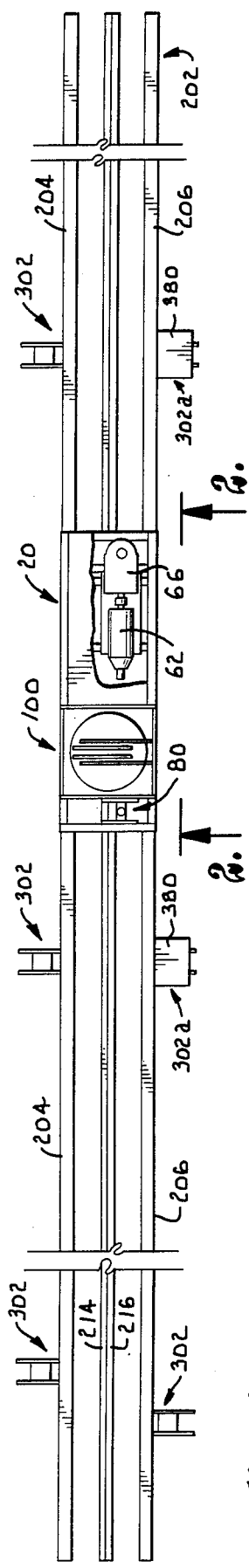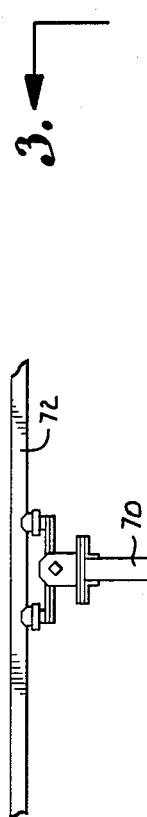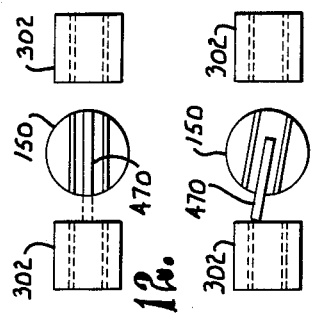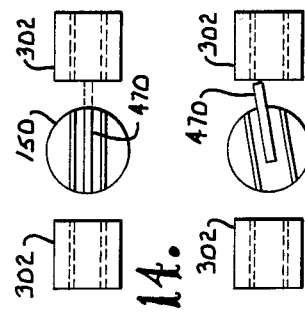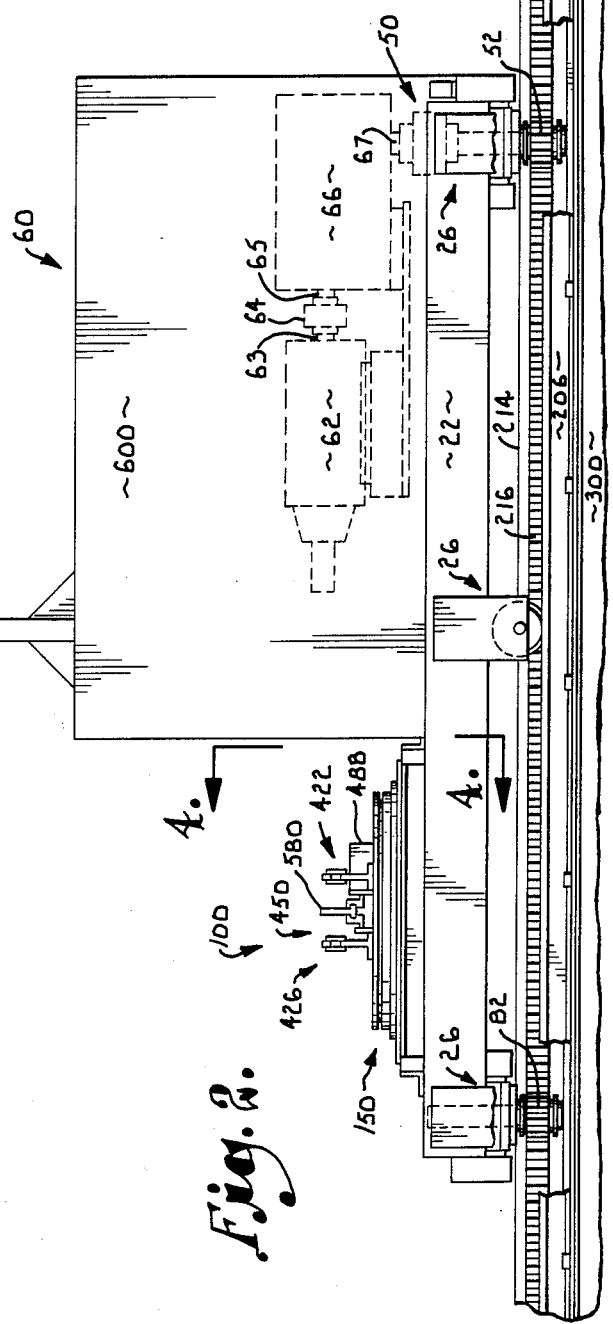

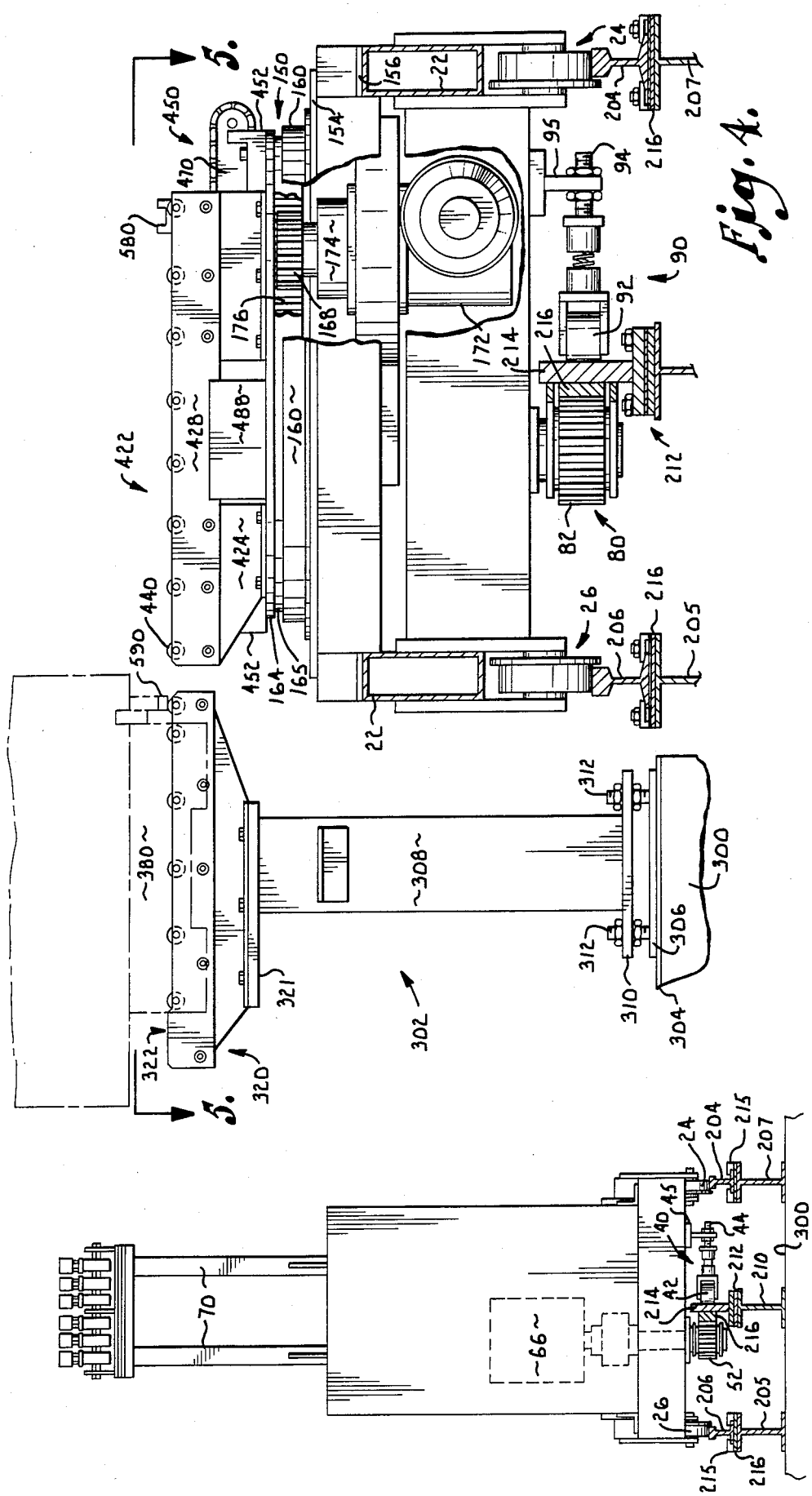

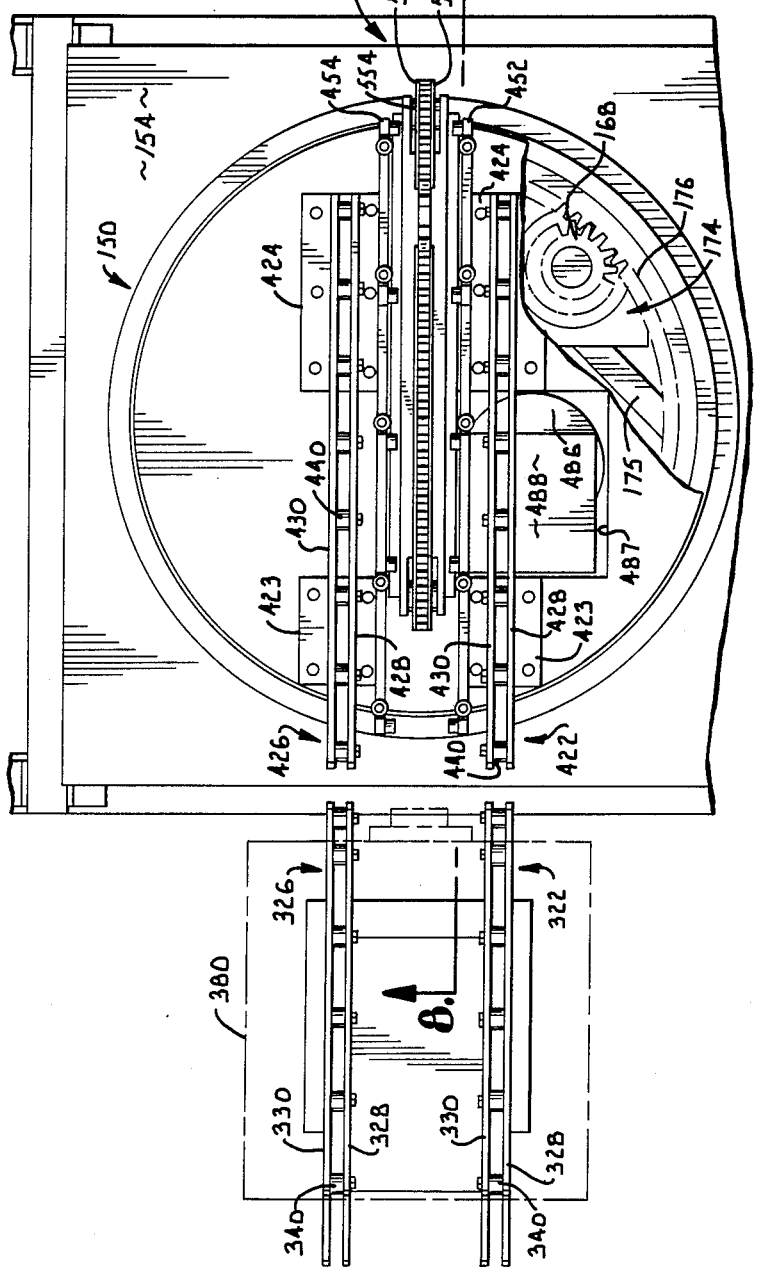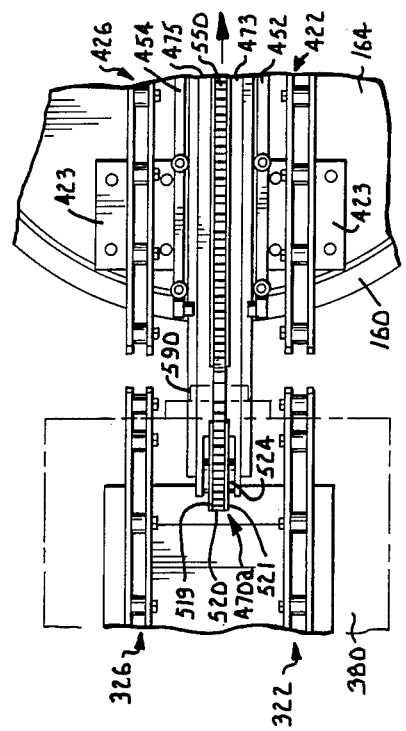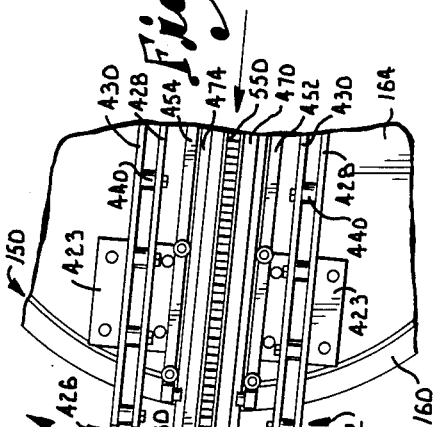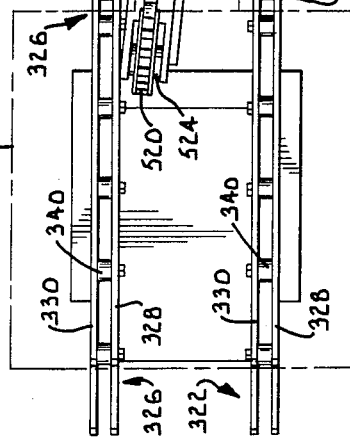

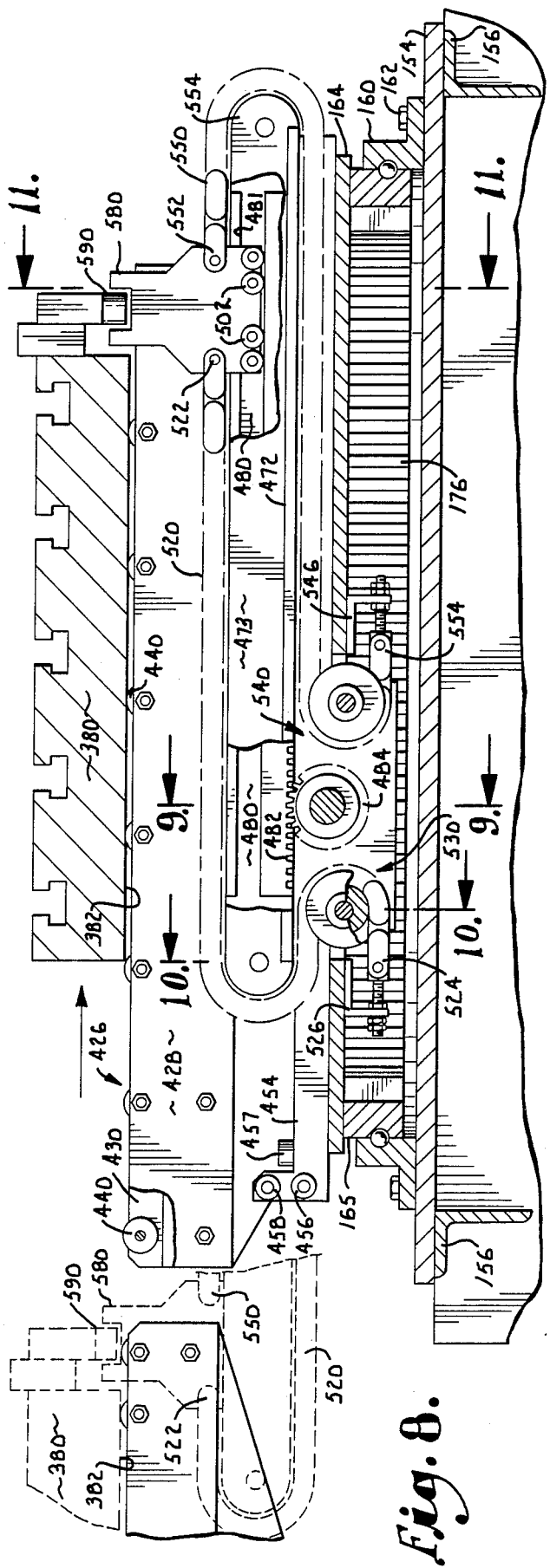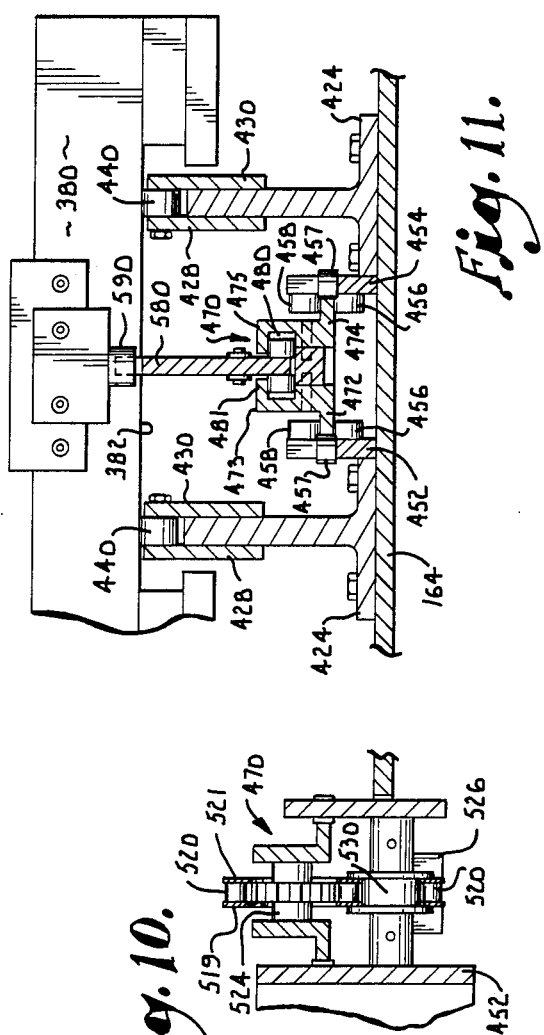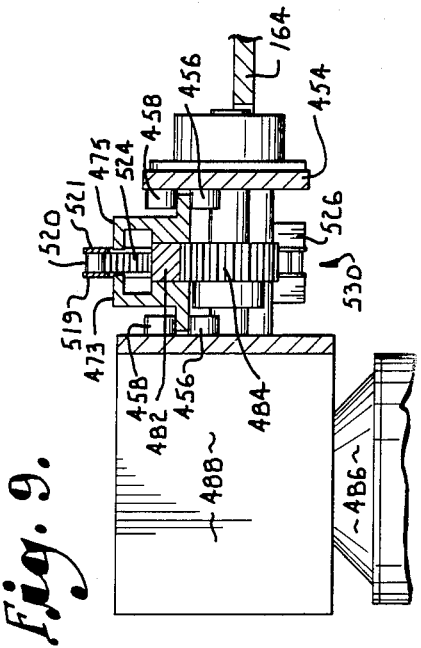

HIGH SPEED TRANSPORTER FOR MULTIPLE STATION PRODUCTION LINE

BACKGROUND OF THE INVENTION

This invention relates to a transporter system for handling materials and, more particularly, to such a system which quickly and accurately transports material-laden pallets between multiple work stations on a production line.

Various types of vehicular systems have been utilized for transporting materials between work stations in assembly or production line operations. A typical application for such systems is in a manufacturing operation where components must be sequenced from a staging area through several machining centers, often then to powered conveyors for manual assembly operations. One such prior system employs an automatic guided vehicle (AGV) which runs on rubber tires and is controlled by a wire line. Auxiliary positioning devices are required at each work station as the AGV cannot itself be controlled with sufficient accuracy.

Another prior art system involves the use of a towveyor, typically with a coupling that may be selectively engaged with a tow line received in a channel in the floor of the production area. The towveyor, as well as the AGV, moves in only one direction and thus requires a continuous loop path in order to service all of the work stations. Accurate positioning at each work station is also a problem. Therefore, in both prior art systems a relatively large amount of floor space is required since movement is unidirectional, and the requirement of auxiliary positioning devices further increases the cost of the system.

In response thereto, we have invented a high-speed, bidirectional transporter for a multiple station production line which provides for the programmable pickup, transport and delivery of materials at non-sequential work stations along the production line. Our system generally comprises a self-propelled transporter which, by a rack and pinion drive, moves along a track that defines a course through the multiple work stations. Movement of the transporter to a work station is controlled by on-board, pre-programmed microcomputers. A turntable on the transporter has been particularly designed for pickup, transport and delivery of material-laden pallets associated with each work station. The turntable includes an extensible and retractable arm which is releasably coupled to a pallet so that the extensible and retractable motion of the arm is transferred to the coupled pallet. Upon movement of the transporter with pallet thereon to a work station, the turntable is rotated into alignment with a pickup and deposit stand at the station. Upon extension of the arm towards the stand, the coupled pallet slides along a guide assembly on the turntable and onto a similar guide assembly on the work station stand. Controlled rotation of the turntable disengages the coupling between the arm and the pallet so that the pallet remains on the stand as the arm is retracted. The transporter is then directed to another work station for pickup of a pallet on the associated stand.

Upon arrival at the next selected work station, the arm is extended and maneuvered into a position so as to couple the arm with the pallet. Once coupled, retraction of the arm moves the pallet along the guide assembly on the work station stand and onto the aligned guide assembly of the turntable of the transporter. The transporter is then propelled along the track for deposit of the coupled pallet at the next work station stand as above-described.

In addition to effecting the coupling and uncoupling of the arm with the pallet, the turntable imparts to the transporter the ability to transfer pallets off of both sides, the turntable being capable of 180° of rotation. Accordingly, work stations may be located on both sides of the track in order to realize a substantial saving in floor space. At the command of the computer, the transporter moves to any station along the line in any order, and addresses either side of the track as required for pickup or delivery of the pallets.

It is, therefore, a general object of this invention to provide a transporter which quickly and accurately picks up, transports and delivers a material-laden pallet between work stations on a production line.

Another general object of this invention is to provide such a transporter which is bidirectional and capable of effecting transfer of pallets from both sides of its path of travel, thereby minimizing floor space and maximizing its speed and flexibility.

As a corollary to the foregoing object, it is an important aim of the invention to provide dual side capability through the use of a rotatable turntable which is controlled so as to address work stations on either side of the path of the transporter.

Furthermore, it is an important object of this invention to provide a transporter, as aforesaid, which has an extensible/retractable arm designed for novel pickup and deposit of a pallet from and at work stations of a production line.

Another object of this invention is to provide an arm, as aforesaid, which has a retracted transport position and an extended pickup or deposit position as controlled by drive assemblies on said transporter.

Still another object of this invention is to provide a coupling member on said arm which engages a coupling member on a pallet so as to provide for movement of said pallet concurrent with said arm.

A still further object of this invention is to provide an arm, as aforesaid, mounted on a transporter turntable which aligns the arm with each work station for pickup and deposit of a pallet thereon.

Another particular object of this invention is to provide a turntable, as aforesaid, which maneuvers said arm into or away from a releasably coupled position with a pallet at each work station.

A still further object of this invention is to provide a pallet stand at each work station which enhances pallet pickup and deposit by said transporter.

Another object of this invention is to provide pallet guide assemblies on said turntable and said stand which facilitate movement of a coupled pallet therebetween with a minimum of mechanical complexity.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 1 is a top plan view, on a reduced scale, showing the transporter between work stations on the production line, with a portion of the transporter broken away to show the transporter propulsion assembly therein;

FIG. 2 is an elevational view, on an enlarged scale, taken along line 2—2 in FIG. 1, showing the transporter mounted on its track with the propulsion assembly illustrated in phantom lines therein;

FIG. 3 is a rear elevational view taken along line 3—3 in FIG. 2, showing the engagement of the transporter drive pinion with a rack extending between the rails of the transporter track;

FIG. 4 is an elevational view, on an enlarged scale and taken along line 4—4 in FIG. 2, illustrating the alignment of the turntable of the transporter with an adjacent work station stand, a portion of the transporter being broken away to show the gear drive assembly utilized for rotating the turntable;

FIG. 5 is a top plan view taken along line 5—5 in FIG. 4, showing the extensible/retractable arm mounted between the pallet guide assemblies, with a portion of the turntable broken away to show the gear drive assembly therein;

FIG. 6 is a fragmentary view of the apparatus shown in FIG. 5 and illustrates the extended relationship of the arm with the adjacent phantom-line pallet shortly after deposit, the arrow indicating rotation of the turntable to disengage the coupling of the arm with the pallet;

FIG. 7 is a fragmentary plan view of the apparatus, as shown in FIG. 6, illustrating the alignment of the guide assemblies on the turntable and stand and the position of the extended arm so as to couple the arm with the phantom-line pallet on the adjacent work station stand;

FIG. 8 is a vertical sectional view taken along line 8—8 in FIG. 5, with a portion broken away to show the rack/pinion mechanism for extending and retracting the arm and further showing in phantom lines, the chain-driven dog assembly associated therewith;

FIG. 9 is a vertical sectional view taken along line 9—9 in FIG. 8, showing the means for mounting the arm on the turntable and the motor/reducer drive train for the associated rack/pinion mechanism;

FIG. 10 is a vertical sectional view taken along line 10—10 in FIG. 8, showing the front sprocket and the chain control assembly for one chain of the chain-driven dog assembly;

FIG. 11 is a vertical sectional view taken along line 11—11 in FIG. 8, showing a coupled pallet supported on the turntable guide assemblies;

FIG. 12 is a diagrammatic view illustrating the turntable positioned between work station stands located on opposite sides of the track, the extensible/retractable arm being in a zero degree position relative to the stand on the left side of the track and the extension of the arm being shown in phantom lines;

FIG. 13 is a diagrammatic view, as in FIG. 12, illustrating the arm in a 10° position relative to the stand on the left side of the track;

FIG. 14 is a diagrammatic view, as in FIG. 12, with the turntable rotated to a 180° position so as to align the arm with the stand on the right side of the track, the extension of the arm being shown in phantom lines; and FIG. 15 is a diagrammatic view, as in FIG. 12, illustrating the arm rotated to a 170° position relative to the stand on the right side of the track.

DESCRIPTION OF THE PREFERRED EMBODIMENT

Turning more particularly to the drawings, FIG. 1 illustrates, on a reduced scale, a layout of a production line having a track 202 with transporter assembly 20 mounted thereon. A plurality of longitudinally spaced-apart work stations are located on both sides of the track 202, and the pickup and deposit stand associated with each is designated 302. Those work stations having a pallet 380 in place have their stands designated as 302a.

The track member 202 includes first and second laterally spaced-apart rail members 204, 206, mounted atop floor-attached I-beams 205, 207, by conventional ASCE rail clips and studs 215. A leveling shim(s) 216 may be interposed between the floor beam 205, 207 and overlying rail 204, 206 (FIG. 3).

Centrally extending between the spaced-apart rails 204, 206 is an elongated, floor-mounted I-beam 210 having an elongated rack track 214 with an interposed spacer bar 212 mounted thereon. A continuous, elongated rack 216 is fastened along a surface of the rack track 214 for functional engagement with drive 52 and idler 82 pinions, associated with the front and rear ends of the transporter assembly 20 to be subsequently described.

Along the track-defined course 202 are located the plurality of work stations to be serviced by the transporter assembly 20. As illustrated in FIG. 4, each work station stand 302 comprises a floor 300-mounted base 304 with mounting plate 306 thereon. A pedestal 308 extends from an upper mounting plate 310 with the latter connected to the base mounting plate 306 via vertically extending nut/bolt combinations 312.

At the top of the pedestal 308 is mounted a pallet support and guide assembly generally designated as 320. The assembly 320 generally comprises a horizontal plate 321 with first and second pallet guides 322, 326 thereon. Each guide 322, 326 comprises a pair of first 328 and second 330 laterally spaced-apart, vertical side rails or plates. A plurality of roller members 340 are rotatably mounted between the adjacent side plates 328, 330. A portion of each roller 340 extends above the top edges of the side plates 328, 330 for rolling contact with the underlying surface 382 of the pallet 380. As such, the pallet 380 is slidable along a course defined by the respective guide assemblies 322, 326.

The transporter assembly 20 (FIG. 2) generally comprises a chassis main frame 22 having a plurality of track engaging wheel assemblies 24 and 26 functionally engaging the respective rails 204, 206. Accordingly, the main frame 22 is movable along the track-defined course 202 of the production line.

Mounted atop the chassis 22 is an electrical housing 60 containing two microcomputers and DC motor control circuitry 600 to be subsequently discussed. As shown in phantom lines in FIG. 2, a DC motor 62 (for example, 20 h.p. at 2,500 r.p.m.) is mounted within the housing 60. A gear coupling 64 joins the output shaft 63 of motor 62 to the input shaft 65 of a right angle helical reducer assembly 66. The output shaft 67 of reducer 66 is coupled to a spur gear head assembly generally designated as 50.

The spur gear head assembly 50, as illustrated in FIG. 3, comprises a depending pinion 52 which engages the rack 216 mounted along the adjacent central rack track 214. Also depending from the chassis 22 is a spring-loaded retainer roller assembly 40. This assembly 40 generally comprises a roller member 42 which wipes the opposed planar surface of the rack track 214. Pressure of the roller 42 against track 214 is adjustable by means of the bolt/nut 44 combination extending through the depending bracket 45. The pressure of the roller 42 is effective in maintaining the desired mesh of the pinion 52 with the rack 216.

As shown in FIG. 4, a similar idler assembly 80 is mounted at the front end of the chassis 22 for engagement of the pinion 82 with the rack 216. Wear guides 85 and 87 are shown as mounted below 87 and above the rack which engages guides 84 and 86 mounted above and below the idler pinion 82. (These guides were not shown in FIG. 3 to assist in illustration.) A spring-loaded retainer roller assembly 90, similar to assembly 40, depends from the chassis 22 on the opposed side of the track 214. The idler roller 92 wipes the opposed surface of the track 214 with the bearing pressure thereof being adjustable by the bolt/nut 94 combination extending from bracket 95. These idler assemblies are effective in maintaining the transporter 20 on line as the driven assembly 50 contacts the adjacent rack 216.

Current and operational commands are delivered to the electrical housing 60 by means of trolley poles 70 functionally engaging an overlying electrical power line and communication bus 72 which parallels the track-defined course 202. Accordingly, current is supplied to the electric motor 62 to rotate the pinion 52 engaged with the adjacent rack 216. Upon such rotation the transporter 20 is propelled along the track 202 in a direction depending on the direction of rotation of the driven pinion 52.

Located at the front end of the transporter 20 is a pallet 380 pickup and delivery assembly 100. The assembly 100 generally comprises a driven rotary turntable 150 having pallet support guide assemblies 422, 426 with a pallet grabber assembly 450 mounted thereon.

The turntable 150 generally comprises a mounting plate 154 affixed atop supporting framework 156 attached to the chassis frame 22. An upstanding, annular rotary bearing 160 is then bolted at 162 atop the plate 154. A rotary base plate member 164 with depending annular flange 165 is then nested within the rotary bearing 160. As such, plate 164 rotates within the rotary bearing 160.

Controlled rotation of the base plate 164 is provided by a spur gear 168 attached to the output shaft of a DC motor 172/reducer 174 assembly which is mounted to the underlying framework 175 attached to the chassis 22. Energization of motor 172 rotates the gear 168 which functionally engages an adjacent annular internal gear 176 inwardly displaced from the depending flange 165. This interengagement rotates the plate 164 as well as the support assemblies 422, 426 and grabber assembly 450 mounted thereon. Such rotation maneuvers an extensible/retractable arm 470 of assembly 450 with respect to the appropriate work station 302. The motor 172 is controlled by the on-board computers in housing 60.

The pallet pickup and delivery assembly 100 includes first 422 and second 426 laterally spaced-apart pallet support guide assemblies. Each assembly 422, 426 comprises first and second side rails or plates 428, 430 which are normally mounted atop the rotary plate 164 by means of mounting brackets 423, 424. A plurality of roller members 440 are rotatably mounted between the opposed side plates 428, 430. Each roller member 440 partially extends above the top edges of the side plates 428, 430. Upon rotation of the turntable 150 by the driven spur gear 168, each guide assembly 422, 426 is rotated into longitudinal alignment with the respective pallet guide assemblies 332, 326 on the work station stand 302 (FIG. 5). The roller members 440 are vertically aligned with the roller members 340 of the guide assemblies 322, 326 by adjustment of the nut/bolt combinations 312 which extend between the plates 306, 310 of the pedestal 308 as above-described. Accordingly, upon longitudinal and vertical alignment of the guide assemblies 422, 426 and 322, 326, a generally uninterrupted pallet track is presented between the stand 302 and transporter 20. This track allows for sliding movement of the pallet 380 between the work station stand 302 and turntable 150 of the transporter 20 in a manner to be subsequently described.

Mounted between the respective pallet support and guide assemblies 422, 426 is the pallet grabber assembly 450 which includes first and second elongated, laterally spaced-apart side rails or plates 452, 454 normally attached atop the rotary plate 164. Each side plate 452, 454 has a plurality of paired, vertically-aligned lower 456 and upper 458 rollers thereon. The rollers 456, 458 are vertically displaced so as to present a gap therebetween. Projecting into this gap are a plurality of spaced-apart, longitudinally aligned, horizontally disposed rollers 457.

The grabber assembly 450 further includes the extensible/retractable arm as presented by elongated beam 470; the general cross-sectional configuration of the beam is shown in FIG. 11. As such, the beam 470 has first and second horizontally-extending flanges 472, 474 which are disposed to slide through the gap presented between the lower 456 and upper 458 rollers. The upper rollers 458 contact the top surface of the flanges 472, 474 with lower rollers 456 contacting the lower surface thereof. The vertical edge of each horizontal flange 472, 474 contacts the horizontally disposed rollers 457 which extend through the respective side plates 452, 454. As such, the elongated arm 470 is easily slidable through the course defined by the rollers on the respective side plates 452, 454.

Extending upwardly from each horizontal flange 472, 474 are facing C-shaped flanges 473, 475. This facing relationship presents an elongated slot 481 in communication with an underlying race 480. The race 480 presents a linear course for movement of rollers 502, associated with a grabber dog 580, therethrough.

The front underside of the arm 470 has a rack configuration 482. A driven pinion 484 functionally engages this underlying rack 482. The pinion 484 is driven by a DC motor 486/reducer 488 assembly which is mounted to the rotary base 164 and extends through an aperture 487 in the plate 164. Controlled rotation of the rack-engaging pinion 484 causes longitudinal movement of the arm 470 along the course defined by the rollers 456, 458 on the respective side plates 452, 454 as above described. The range of movement of this arm 470 includes a first retracted position, in which the arm 470 is within the confines of the turntable 150, as shown in FIGS. 4, 5 and 8. The arm 470 is also movable to a second extended position, in which the arm 470 extends beyond the side of the transporter 20, as shown in FIGS. 6, 7 and in the phantom line position in FIG. 8. The arm 470 is thus movable between extended and retracted positions toward and away from any one stand 302.

The grabber dog 580 is associated with the retractable/extensible arm 470. Dog 580 is designed to effect a releasable coupling with a depending roller dog 590 on pallet 380. Upon such coupling, movement of the grabber dog 580 and arm 470 is transferred to the engaged pallet 380. The dog 580 has a plurality of rollers 502 slidable through the race 480 presented by the C-shaped flanges 473, 475 of the arm 470. Movement of the dog 580 along race 480 is provided by first and second chain drive assemblies which include drive chains 520, 550. Chain 520 has a proximal end 522 attached to dog 580. The chain 520 then extends along the top of the arm 470 and through front guides 519, 521. The chain 520 is wound in a counterclockwise direction, as viewed in FIG. 8, about a sprocket member 524 rotatably mounted between the front ends of the arm 470.

The chain 520 then extends through the plate aperture 487 and towards an underlying chain guide assembly 530 which is mounted to the plate 164 in partial extension above the surface thereof. The chain 520 is wound about the chain guide 530 in a clockwise direction, as viewed in FIG. 8, with the distal end 524 being attached to a bracket chain connector 526 mounted to the underside of the rotary plate 164. The proximal end 552 of a second chain 550 is attached to the dog 580 and is first directed between rear chain guides 549, 551 and then wound in a clockwise direction, as viewed in FIG. 8, about a sprocket member 554 rotatably mounted between the rear ends of the arm 470. The chain 550 is then directed along the underside of the beam 470 and about an underlying chain guide assembly 540 attached to the underlying rotary plate 164. The distal end 554 of chain 550 is then attached to the bracket connector 546.

At this juncture, the arm 470 is movable between the retracted and extended positions as provided by operation of the rack 482/pinion 484 combination. This movement causes alternating take-up and release of the chains 520, 550 which is translated into concurrent movement of the grabber dog 580 between the front and rear positions on arm 470. As such, the retracted position of the arm 470 results in a retracted position of the dog 580, i.e. to the rear end of arm 470. Conversely, extension of the arm 470 moves the dog 580 towards the front end of the arm 470.

The top of the grabber dog 580 presents a U-shaped notch which is adapted to receive the roller dog 590 depending from the front of pallet 380. The rotation of the turntable 150 is controlled so that the notch in dog 580 moves through an arcuate path toward or away from roller dog 590 to rotate the grabber dog 580 into or out of engagement with the depending roller dog 590.

OPERATION

The on-board computers direct delivery of current to the appropriate motors 62, 172, 486 so as to drive the corresponding gear combinations 52/216, 168/174, 482/484. These respectively energized drives propel the transporter 20 to the appropriate work station stand 302, rotate the turntable 150 and extend/retract the arm 470.

More particularly, the two microcomputers and the DC motor control circuitry 600 within the electrical housing 60 of the transporter are responsible for control of these three drives typically in response to commands from a scheduler (not shown) which is external to the system and which transmits pickup and delivery information in the form of binary coded commands. The scheduler may be a computer output inputted to the on-board microcomputers via an overhead communications link that is provided by the bus 72 connected to the microcomputers via the trolley poles 70. Alternatively, scheduling commands could be generated by operator selection of the work stations to be sequentially addressed by the transporter and the functions to be executed at each, i.e., pickup or delivery of a pallet.

Each of the motors 62, 172 and 486 is controlled by a conventional DC motor regulator which functions as a DC amplifier to control the power delivered to a corresponding motor in a direct ratio to an input control signal. The two microcomputers (master and secondary) derive the control signals applied to the power amplifiers in response to commands from the scheduler and position information generated by pulse generators coupled to the shafts of the respective motors 62, 172 and 486. Whenever a particular motor is operated, the coupled pulse generator produces a series of pulses representing the angular position of the motor shaft within a particular revolution. For example, the generator may produce a thousand pulses for each 360 degrees of rotation thereby effectively dividing the identifiable position of the motor shaft into one thousand increments.

It has been found that the division of functions between two microcomputers, each in a closed-loop servo system, provides a saving in equipment cost and assures quality of performance. The master microcomputer controls the movement of the transporter 20. It receives the command from the scheduler and deciphers the same to determine the motion or motions required to execute the command. In addition to position information derived from the motor 62, it also receives information about status of the system as may, for example, be provided by photosensors at the work station stands 302 to sense the presence or absence of a pallet at the respective stand. Other photocontrols may also be provided as dictated by a particular application, such as overtravel sensors and position checks. The master computer compares present system status with the scheduler command and produces the appropriate control signals to direct the amplifier of the DC regulator that drives the transporter motor 62. Other control signals are produced which are commands to the secondary microcomputer.

The function of the secondary computer is to generate control signals that direct the amplifiers of the DC regulators which control the motors 172 and 486 that rotate the turntable 150 and extend and retract the arm 470. The control signals to the respective amplifiers are derived from a comparison of the command information from the master computer and the position information with respect to the two motors under control. In both the master and the secondary microcomputer, software appropriate to a given application would be employed to enable each computer to derive acceleration, velocity and relative position data from the pulse generator coupled with the corresponding motor under control.

It will now be assumed for purposes of illustration that the transporter has been commanded to pick up a pallet at a particular work station. Once the transporter 20 is stopped at the work station stand 302, motor 172 is energized so as to rotate pinion 168 and the associated turntable 150. Concurrent with such rotation is extension of the arm 470 and dog 580 thereon as provided by the rack 482/pinion 484 operation. The turntable 150 is rotated towards a zero degree position (left) or a 180° position (right) depending on whether the work station stand 302 is to the left or right of the course 202. The type of command also dictates the degree of rotation of the turntable 150 according to whether the transporter 20 is in a pallet pickup or deposit mode. If the transporter 20 is to retrieve a pallet 380 on the left side of the track, the drive motors 486, 172 concurrently extend the arm 470 and associated dog 580 and rotate the arm to a 10° position, as shown in FIGS. 6 and 13. (The zero degree position of the arm 470 is as shown in FIGS. 5, 7 and 12 in which the pallet guide assemblies 322, 326 and 422, 426 are aligned.) Once so positioned, the turntable 150 then rotates to a zero degree position (FIG. 7) which moves the notched grabber dog 580 through a 10° arcuate path and into releasable engagement with the depending roller dog 590. Once engaged, the motor 486 is energized to rotate pinion 484 so as to retract the arm 470 and engaged grabber dog 580. As the arm 470 is coupled to the pallet 380 by the grabber dog 580/roller dog 590 interengagement, the pallet 380 slides along the respective guide assemblies 322, 326 on the work station stand 302 and onto the guide assemblies 422, 426 atop the turntable 150. Upon movement of the arm 470 and the engaged grabber dog 580 to their retracted positions as shown in FIG. 8, the pallet 380 is in a transport position atop the turntable 150.

The main drive motor 62 then rotates the depending pinion 52 to propel the transporter 20 to the next selected work station stand 302. This subsequent stand 302 may be either to the front or rear of transporter 20 and left or right of the track-defined course 202. Assuming that the work station is to the right of the track-defined course, motors 486, 174 are energized to extend the arm 470 and dog 580 and rotate the turntable to a 180° position (FIG. 14). This rotation aligns the respective pallet guide assemblies 422, 426 on the rotating turntable 150 with those assemblies 322, 326 on the associated stand 302. Full extension of the arm 470 positions the pallet 380 on the guide assemblies 322, 326. Subsequent rotation of the turntable 150° to a 170° position (FIG. 15) disengages the depending roller 590 from the notch of the grabber dog 580. The arm 470 is then retracted and the transporter 20 is directed to the next work station for pickup of another pallet 380.

In summary, the gear 176/168 combination, as driven by the energized motor 172/reducer 174 assembly, presents a means to control rotation of the turntable 150 and arm 470 thereon toward or away from any one stand 302. The rack 482/pinion 484 combination, as driven by the energized motor 486/reducer 488 assembly, presents a means to control extension and retraction of the arm 470. These means cooperate to present a control means which selectively moves the arm 470 between extended and retracted positions toward and away from any of the stands 302.

Thus, if a pallet 380 is to be deposited, the control means rotates turntable 150 to either a zero degree or a 180° position so as to align the respective guide assemblies 322, 326 and 422, 426. Extension of the arm 470 transfers the engaged pallet 380 from the turntable 150 of transporter 20 and onto the work station stand 302. Once transferred, the turntable rotates 10° so as to disengage the depending roller 590 from the grabber dog 580. The arm 470 is then retracted.

If the transporter 20 is in a pickup mode, the turntable first rotates to either a 10° or 170° position. Once the arm 470 with dog 580 is fully extended, the turntable 150 rotates to a zero degree or 180° position. This ten degree arcuate motion allows for engagement of the depending roller 590 on pallet 380 with the notched grabber dog 580. Subsequent retraction of the arm 470 then effects a sliding movement of the coupled pallet 380 from the guide assemblies 322, 326 on the work station stand 302 onto the guide assemblies 422, 426 on the turntable 150.

It is to be understood that while certain forms of this invention have been illustrated and described, it is not limited thereto, except in so far as such limitations are included in the following claims.

Having thus described the invention, what is claimed as new and desired to be secured by Letters Patent is:

1. In a material handling system having a plurality of spaced work stations, apparatus for transporting material to and from each of said stations comprising:
   a track defining a predetermined course;
   a plurality of stands spaced along said track on both sides thereof, each of said stands being adapted to receive a material-laden pallet thereon;
   a transporter movable along said track;
   first control means for propelling said transporter along said track and for selectively stopping said transporter at any of said stands;
   a turntable on said transporter for carrying a pallet thereon;
   an extensible and retractable arm;
   means mounting said arm on said turntable for rotation therewith;
   second control means for selectively rotating said turntable through an arc traversing said track to swing said arm to an aligned, pickup and deposit position with respect to a selected stand on one side of said track or to said aligned position with respect to a selected stand on the other side of said track, and including means for moving said arm between extended and retracted positions toward and away from any selected stand;
   means on said arm for releasably coupling a pallet with said arm for transfer of a coupled pallet from a selected stand to said turntable upon retraction of said arm, and for transfer of a coupled pallet from said turntable to a selected stand upon extension of said arm, said releasable coupling means including a dog engageable with a pallet; and
   said second control means further including means for rotating said turntable to an angular position misaligning the turntable and selected stand to preclude engagement of said dog with a pallet thereon during extension of said arm to pick up a pallet, or after deposit of a pallet to effect disengagement of said dog from the deposited pallet.

2. The apparatus as claimed in claim 1 wherein said first control means includes:
   a pinion associated with said transporter;
   a rack mounted along the extent of said track in engagement with said pinion; and
   means on said transporter for rotating said pinion to drive the transporter along the track.

3. The apparatus as claimed in claim 1 further comprising a first support guide on said turntable, said first guide supporting a pallet positioned on said turntable.

4. The apparatus as claimed in claim 3 wherein said support guide includes a plurality of rollers thereon, said rollers slidably supporting a pallet during movement of said pallet along said first support guide.

5. The apparatus as claimed in claim 4 further comprising a second support guide on each of said stands, said first support guide being selectively alignable with said second guide of an associated stand, said aligned guides presenting a course for movement of a coupled pallet therebetween.

6. The apparatus as claimed in claim 5 wherein said second support guide of each stand includes a plurality of rollers thereon, said rollers providing for sliding support of a pallet during movement of said pallet along said second support guide.

7. The apparatus as claimed in claim 1 wherein said arm moving means of said second control means includes:
   a pinion;
   a rack associated with said arm and in engagement with said pinion; and
   means for selectively rotating said pinion, said pinion being rotatable in opposed directions to move said arm between said extended and retracted positions.

8. The apparatus as claimed in claim 1 further comprising:
   a race along the extent of said arm for movement of said dog therealong; and
   means for moving said dog along said race during movement of said arm, said dog moving means positioning said dog at one end of said arm upon extension of said arm and at the opposed end of said arm upon retraction of said arm.

9. The apparatus as claimed in claim 8 wherein said dog moving means comprises a chain drive assembly associated with said dog, said chain drive assembly being operable by said movement of said arm whereby to provide for movement of said dog in a first direction along said race during extension of said arm and in a second opposed direction along said race during retraction of said arm.

10. The apparatus as claimed in claim 9 wherein said dog moving means positions said dog at an end of said arm adjacent a selected stand during said arm extension, said movements of said arm and said dog providing for concurrent movement of a pallet coupled therewith between said table and said stand.

11. The apparatus as claimed in claim 9 wherein said dog moving means positions said dog at the opposed end of said arm displaced from a selected stand and adjacent said turntable during said arm retraction, said movements of said arm and said dog providing for concurrent movement of a pallet coupled therewith between said stand and said turntable.

12. The apparatus as claimed in claim 1 wherein said arm mounting means comprises at least one rail member extending from said turntable, said rail member interfacing with said arm in a manner to allow for sliding movement therebetween upon operation of said arm moving means.

13. The apparatus as claimed in claim 1 wherein said arm mounting means comprises:
   first and second laterally spaced-apart rails;
   roller means mounted on each of said rails; and
   means on said arm for engaging said roller means, said roller means providing for sliding movement of said arm along said first and second rails.

14. The apparatus as claimed in claim 13 wherein said turntable is provided with first and second upstanding support guides respectively adjacent said first and second rails, said guides offering underlying support to a pallet positioned on said turntable and coupled to said arm.

15. The apparatus as claimed in claim 14 wherein each support guide includes a plurality of rollers thereon, said rollers providing for sliding movement of a pallet along said support guides during said extension and retraction of said arm.

16. The apparatus as claimed in claim 14 further comprising a support guide assembly on each of said stands, said first and second support guides on said turntable being selectively alignable with said support guide assembly of an associated stand, said aligned guides presenting a course for movement of a coupled pallet therebetween.

17. The apparatus as claimed in claim 16 wherein said support guide assembly on a corresponding stand includes a plurality of rollers thereon, said rollers providing for sliding support of a coupled pallet thereon.

18. The apparatus as claimed in claim 1 wherein said arc is at least 180°.

* * * * *